Feb. 3, 1925.
E. I. DODDS
1,525,171
WHEEL STRUCTURE
Filed Dec. 13, 1920
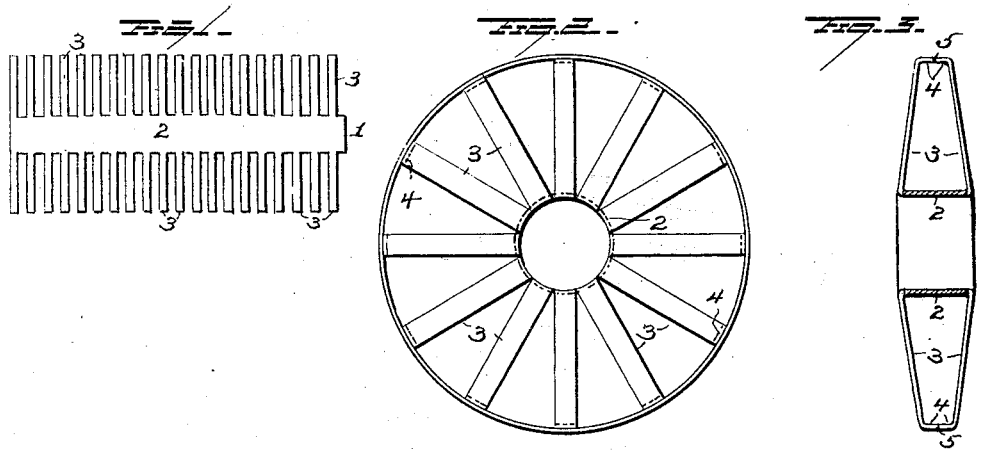
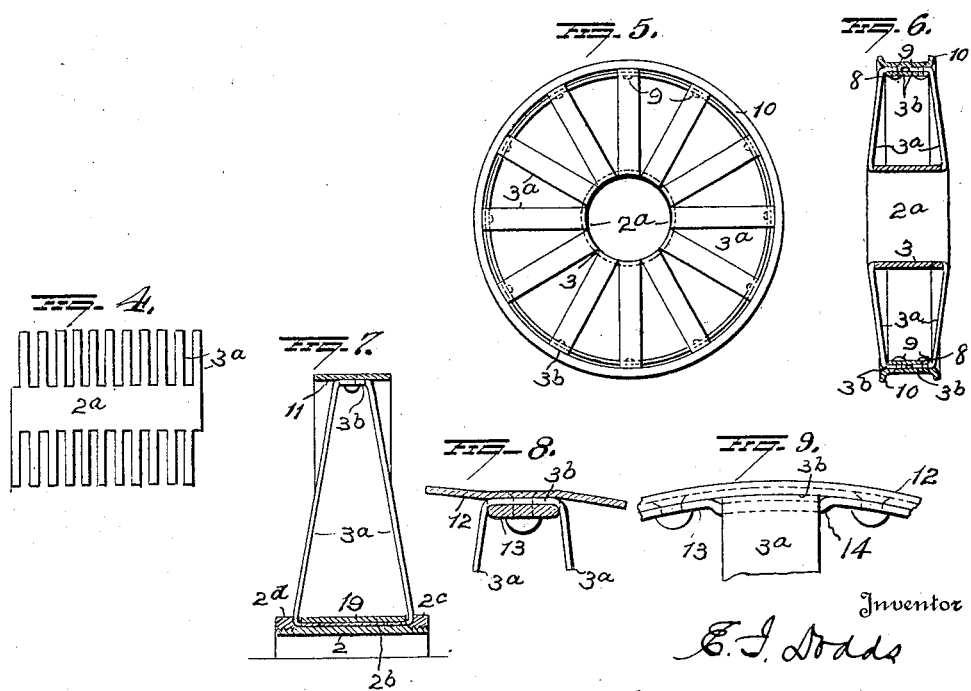
Inventor
E. I. Dodds
By Seymour & Bright
Attorneys Patented Feb. 3, 1925.

1,525,171

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA.

WHEEL STRUCTURE.

Application filed December 13, 1920. Serial No. 430,271.

*To all whom it may concern:*

Be it known that I, ETHAN I. DODDS, a citizen of the United States, and a resident of Central Valley, in the county of Orange and State of New York, have invented certain new and useful Improvements in Wheel Structures; and I do hereby declare the following to be a full, clear, and exact description of the invention, such as will enable others skilled in the art to which it appertains to make and use the same.

This invention relates to improvements in wheels and more particularly to such as have sheet metal body portions,—one object of the invention being to provide a sheet metal wheel construction which shall be simple and substantial and which can be economically manufactured.

With this and other objects in view, the invention consists in certain novel features of construction and combinations of parts as hereinafter set forth and pointed out in the claims.

In the accompanying drawings; Figure 1 is a view of the blank from which the wheel body is made; Figure 2 is a side elevation of a wheel body made from said blank; Figure 3 is a sectional view of the wheel body; and Figures 5 to 9 inclusive are views showing modifications.

1 represents a sheet metal blank,—a number of which may be economically cut from a sheet of metal. The blank 1 comprises a longitudinal plain central portion, from each edge of which a number of fingers project,—the fingers at one side of the plain central portion being in line with the fingers at the other side, and all of said fingers form spokes 3 in the structure of the wheel body. The blank 1 will be first bent to form a cylinder and the two meeting edges at the central plain portion 2 will be welded together. The finger at respective edges of the portion 2 of the blank will be bent outwardly forming the radial spokes 3 of the wheel body while the portion 2 forms the hub portion of said body. The free end portions of the respective sets of spokes may be bent inwardly as at 4 and welded together as at 5 and a wheel rim may be secured to the connected outer free end portions of the spokes.

Instead of so shaping the blank that the fingers which form the spokes, at one side of the plain portion 2 of the blank shall align with the fingers at the other side, as shown in Figure 1,—the blank may be formed as shown in Figure 4, in which the fingers or spoke members 3$^a$ at one side of the plain portion 2$^a$, will alternate with the fingers or spoke members at the other side. When this blank is formed and bent in the manner previously explained, the spokes 3$^a$ at one side of the wheel body will alternate with the spokes 3$^a$ at the other side, as shown in Figure 5. The spokes 3$^a$ at respective sides of the wheel may be provided with inwardly turned flanges 3$^b$ at their free ends and these flanges may be secured to a ring 8 by means of rivets or bolts 9, the latter also serving to secure a channel rim 10 to the rim portion of the wheel body, as shown in Figure 6. If desired the inwardly projecting flanges 3$^b$ of the spokes at respective sides of the wheel may be disposed as in Figure 7 and riveted to a wheel rim 11, or the flanges 3$^b$ of the spokes may be secured to a wheel rim 12 by means of a ring 13 riveted to said rim and having loop portions 14 to receive the spoke flanges, as shown in Figures 8 and 9.

The hub portion (such as shown at 2 or 2$^a$) of the wheel body may be located in a recess 2$^b$ in a wheel hub 2$^c$ and said hub may be threaded at one end to receive a retaining ring 2$^d$. A band 19 surrounds the hub portion 2 or 2$^a$ of the wheel body and may be welded thereto.

Having fully described my invention what I claim as new and desire to secure by Letters-Patent, is:—

1. A wheel structure, comprising a strip having a set of fingers at each edge, said strip being bent into circular form and said fingers being bent to form radial spokes, said spokes having at their outer ends inwardly projecting flanges at the rim portion of the structure, the inwardly projecting flanges of one set of spokes being connected with the inwardly projecting flanges of the other set of spokes.

2. A wheel structure, comprising a strip having a set of fingers at each edge, said strip bent into circular form and said fingers bent to form radial spokes, said spokes having at their outer ends, inwardly projecting flanges forming a rim portion for the structure, the inwardly projecting flanges of one set of spokes united at their inner ends to the flanges of the other set of spokes.

3. A wheel structure, comprising a strip having a set of fingers at each edge, said strip bent into circular form and said fingers bent to form radial spokes, said spokes having at their outer ends, inwardly projecting flanges forming a rim portion for the structure, the inwardly projecting flanges of one set of spokes welded at their inner ends to the flanges of the other set of spokes.

ETHAN I. DODDS.

Witnesses:
ETHAN IRA DODDS, Jr.,
HENRY W. CROMWELL.